(12) United States Patent
Mayerle et al.

(10) Patent No.: US 7,140,310 B2
(45) Date of Patent: Nov. 28, 2006

(54) SYSTEM AND METHOD FOR DISTRIBUTING MULTIPLE MATERIALS FROM AN AGRICULTURAL VEHICLE

(75) Inventors: Dean J. Mayerle, Saskatoon (CA); Ronald N. Engen, Beaumont (CA); Allen W. Evans, Slater, IA (US)

(73) Assignee: CNH Canada, Ltd., Racine, WI (US)

( * ) Notice: Subject to any disclaimer, the term of this patent is extended or adjusted under 35 U.S.C. 154(b) by 0 days.

(21) Appl. No.: 10/715,580

(22) Filed: Nov. 18, 2003

(65) Prior Publication Data
US 2005/0103244 A1    May 19, 2005

(51) Int. Cl.
*A01C 7/00* (2006.01)

(52) U.S. Cl. ............... 111/175; 221/211; 222/144.5; 222/145.1

(58) Field of Classification Search .......... 111/174, 111/178, 175, 177, 186, 187, 188; 222/142, 222/132, 145.7, 145.8, 136, 144.5, 145.1; 221/211, 278
See application file for complete search history.

(56) References Cited

U.S. PATENT DOCUMENTS

| | | | | |
|---|---|---|---|---|
| 3,153,494 A | * | 10/1964 | Heider | 222/136 |
| 4,264,023 A | * | 4/1981 | Stocks et al. | 222/614 |
| 4,779,765 A | * | 10/1988 | Neumeyer | 222/142 |
| 5,064,099 A | * | 11/1991 | Iwako | 222/142 |
| 5,161,473 A | | 11/1992 | Landphair et al. | |
| 5,189,965 A | * | 3/1993 | Hobbs et al. | 111/178 |
| 5,592,889 A | * | 1/1997 | Bourgault | 111/174 |
| 5,655,468 A | * | 8/1997 | Ledermann et al. | 111/164 |
| 5,915,313 A | * | 6/1999 | Bender et al. | 111/178 |
| 5,927,217 A | * | 7/1999 | Halford et al. | 111/174 |
| 5,980,163 A | * | 11/1999 | Gregor et al. | 406/144 |
| 6,047,652 A | | 4/2000 | Prairie et al. | |
| 6,164,222 A | | 12/2000 | Mayerle et al. | |
| 6,193,175 B1 | | 2/2001 | Andersson et al. | |
| 6,267,067 B1 | | 7/2001 | Mayerle et al. | |
| 6,516,733 B1 | * | 2/2003 | Sauder et al. | 111/180 |
| 6,832,567 B1 | * | 12/2004 | Carr et al. | 111/185 |
| 6,845,724 B1 | * | 1/2005 | Mayerle et al. | 111/174 |

OTHER PUBLICATIONS http://www.flexicoil.com/rowcrop/tools/photogallery/9000⎯gallery1.htm; Flexi-Coil Row Crop: 9000 Field Shot, dated May 22, 2003.
Flexi-Coil Air Carts, "How Does Air Delivery Work?".
Flexi-Coil 9000 Planting System, Precision Planting, three pages.

* cited by examiner

*Primary Examiner*—Victor Batson
(74) *Attorney, Agent, or Firm*—Rebecca Henkel

(57) ABSTRACT

A system and method for distributing multiple types of seed, fertilizer or other materials from an agricultural vehicle is disclosed. The system includes first and second sources holding the first and second materials, respectively, a plurality of distribution units, and a nurse distribution mechanism coupled between the sources and the distribution units by which each of the first and second materials from the respective first and second sources can be transmitted to the plurality of distribution units.

16 Claims, 6 Drawing Sheets

SYSTEM AND METHOD FOR DISTRIBUTING MULTIPLE MATERIALS FROM AN AGRICULTURAL VEHICLE

STATEMENT REGARDING FEDERALLY SPONSORED RESEARCH

Not applicable.

CROSS-REFERENCE TO RELATED APPLICATIONS

Not applicable.

FIELD OF THE INVENTION

The present invention relates to agricultural vehicles and, more particularly, to systems and methods for distributing materials from such agricultural vehicles onto the ground.

BACKGROUND OF THE INVENTION

Agricultural vehicles, such as planters towed by tractors, are often employed to distribute materials such as seeds, fertilizers, pesticides, other chemicals and other materials along the ground as they travel. Commonly, a slurry of a given material is separated into finely-granulated particles by one or more "singulators" and then distributed in a highly controlled manner (e.g., one particle at a time) by one or more meters that are positioned at different locations along the vehicle.

In vehicles employing meters that are located relatively far away from the central tank or hopper in which a material is held, additional "nursing" systems have been implemented that facilitate the delivery of the material to the meters. Typically, nursing systems operate by picking up the material at a tank and then delivering, on demand, the material down one or more distribution lines to smaller reservoirs associated with the meters. When a smaller reservoir is low on material, the nursing system automatically starts to pick up additional material and fills the smaller reservoir, without any electronic or mechanical controls. Nurse distribution systems improve the feasibility of supplying multiple meters with material from a single central tank, and thus reduce the amount of time and labor required to keep the central tank filled, which improves the efficiency of planting and other agricultural operations.

In contrast to the operation of the singulators, which separate materials into particulate form to allow highly controlled delivery, nurse technologies deliver material from a first location (e.g., the tank) to a second location (e.g., a reservoir on a singulator/meter) as a slurry of particles. There are generally two types of nursing distribution systems—series and parallel nursing distribution systems. Exemplary series and parallel nursing distribution systems are shown in U.S. Pat. Nos. 6,047,652 and 6,267,067, which are respectively entitled "Seed Planter Distribution System" and 'Nurse Receiver and Header for Air Seeders", which respectively issued on Apr. 11, 2000 and Jul. 31, 2001, and which are each hereby incorporated by reference herein.

Relatively recently, there has arisen increased interest in the capability of distributing not merely one but more than one material from a given agricultural vehicle. As the size of farms has continued to increase, the need to be able to distribute different materials at different portions of the farms has grown. Additionally, as farming techniques have become increasingly sophisticated, the desirability of being able to switch over from distributing one type of material to distributing another type of material depending upon a variety of conditions (e.g., slope and other terrain conditions) has also increased. Further, as the size of farms has increased and the number of persons engaged in farming labor has decreased, the desire for large storage tanks on planters where a farmer can plant one large field with a first seed variety and then plant a second large field with a second seed variety, without stopping to fill tanks in between, has increased. The use of such large storage tanks potentially allows a farmer to plant all day without stopping.

While the distribution of multiple materials has increasingly become of interest, presently-available systems for allowing such distribution are unsatisfactory. One existing system employs a tank having two or more compartments that, depending upon the position of a divider mechanism, are respectively coupled to the same singulator located proximate the tank. Although this system allows for more than one material to be distributed, this system is disadvantageous because the multi-compartment tank is difficult for farmers to fill and additionally because the amount of material that can be stored in any given compartment of the tank is much less than the amount of material that ordinarily would be stored in the tank in the absence of such compartmentalization. Further, because the singulator is located close to the tank (rather than at the row units), the amount of accuracy in controlling seed distribution afforded by the singulator is reduced.

Other existing systems employ two tanks on the agricultural vehicle, each of which can carry its own particular material. However, in such systems (which are typically implemented on planters), the two tanks are respectively coupled to first and second sets of meters that are respectively positioned on opposite sides of the planter. Consequently, while these systems allow for two different materials to be distributed (even at the same time) by a planter, the systems are typically only operated in this manner when the operator wants to continuously plant different materials, since switching back and forth would be impractical.

Although, with respect to these systems having two tanks, it is in some circumstances possible to alter which side of the planter distributes which material by rearranging the lines coupling the tanks to the row units, such an alteration process typically is impractical. In particular, the alteration process typically requires that an operator physically disconnect and reconnect the lines coupling the tanks to the row units, which is a slow and arduous operation.

Accordingly, it would be advantageous if a new system for distributing materials from an agricultural vehicle was developed that made it possible for each of two or more different types of materials to be easily distributed from all of the row units (or meters) of the vehicle. It further would be advantageous if such a new system made it easy for an operator (or a control device) to easily and rapidly switch the type of material being distributed by the vehicle. It further would be advantageous if, despite being able to distribute two or more materials, the new system was capable of distributing each of the materials in an accurate, controlled manner. It additionally would be advantageous if the new system was capable of distributing large amounts of each type of material.

SUMMARY OF THE INVENTION

In particular, the present invention relates to a system for distributing first and second materials. The system includes first and second sources holding the first and second materials, respectively, and a plurality of distribution units. The system further includes a nurse distribution mechanism coupled between the sources and the distribution units by which each of the first and second materials from the respective first and second sources can be transmitted to the plurality of distribution units.

The present invention additionally relates to an agricultural vehicle. The agricultural vehicle includes a frame, and first and second tanks holding first and second materials, respectively, where the first and second tanks are supported by one of the frame and a secondary support portion at least indirectly coupled to the frame. The agricultural vehicle further includes a plurality of distribution units supported by the frame, and a nurse distribution mechanism coupled between the tanks and the distribution units by which each of the first and second materials from the respective first and second tanks can be transmitted to the plurality of distribution units.

The present invention further relates to a method of distributing first and second materials from an agricultural work vehicle onto a surface. The method includes receiving the first material into a first compartment and the second materials into a second compartment, and transmitting a first portion of one of the first and second materials by way of a nurse distribution mechanism to at least one metering device. The method additionally includes distributing the first portion by way of the at least one metering device, communicating a command concerning a change in a status of a controlled device including at least one of the nurse distribution mechanism and the at least one metering device, and changing the status of the controlled device in response to the command. The method further includes transmitting a second portion of the other of the first and second materials by way of the nurse distribution mechanism to the at least one metering device, and distributing the second portion by way of the at least one metering device.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

DESCRIPTION OF THE PREFERRED EMBODIMENT

The figures and corresponding text below describe several exemplary embodiments of the invention. However, it should be understood that the present disclosure is only exemplary of the invention and is not intended to be limiting and that the claims below should be referred to for a full understanding of the scope of the invention.

Figure 1:
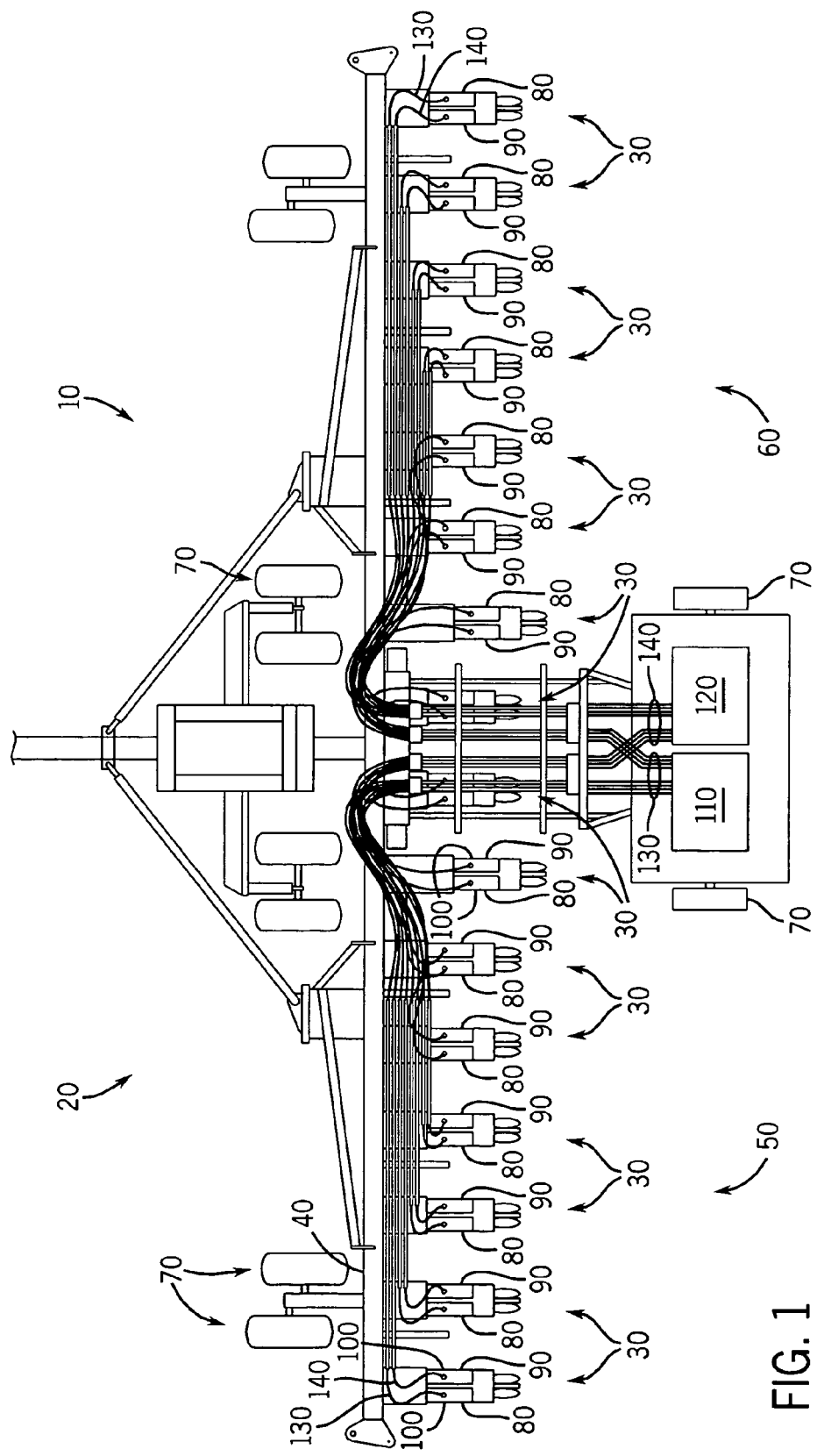
FIG. 1 is a top view of an exemplary agricultural vehicle employing a first embodiment of a system for distributing multiple materials from the vehicle.

Referring to FIG. 1, an exemplary agricultural vehicle is shown to be, in this case, a 40-foot planter 20 such as the 9000 planter manufactured by CNH Global NV of Racine, Wis. The planter 20 includes a system 10 for distributing two different materials (in this case, typically, seed materials) onto the ground in a field. The system 10 shown in FIG. 1 is only a first embodiment of multiple embodiments for providing such distribution of multiple materials that are encompassed by the present invention, and a number of such other embodiments are discussed further with respect to FIGS. 2–7. As shown in FIG. 1, the planter 20 includes 16 row units 30 spaced apart from one another along a frame 40 of the planter. The row units 30 are shown to be approximately equally spaced, with half of the row units on a left side 50 of the planter 20 and the other half of the row units 30 on a right side 60 of the planter. The planter 20 travels along the ground upon a plurality of wheels 70 and is towed by another agricultural vehicle such as a tractor (not shown).

As shown, each of the row units 30 in the system 20 includes respective first and second meters 80, 90. Each of the meters 80, 90 includes a respective singulator (not shown) for separating individual particles of the material, and a respective reservoir 100. In the embodiment shown, the planter 20 includes a first tank 110 and a second tank 120, which respectively are capable of holding first and second materials (not shown). Typically, each of the first and second tanks 110,120 is pressurized with air and includes a respective nurse inductor box (not shown) that can be actuated to combine the pressurized air with the respective material held in the tank to output a stream of the material. The tanks 110,120 can be supported upon a frame of the planter 20 as shown (or other implement), or upon a cart, tool bar or other component coupled directly or indirectly to the implement frame. The first and second materials of the first and second tanks 110,120 can be different from one another or can be the same, and can range from different seed varieties and different seed materials to different fertilizers, pesticides, other chemicals and other materials. Typically, each material is a slurry of particles.

As shown, the first tank 110 is coupled to the reservoirs 100 of each of the first meters 80 of each of the row units 30 by way of a first set of nurse distribution lines 130, while the second tank 120 is coupled to the reservoirs 100 of each of the second meters 90 of each of the row units by way of a second set of nurse distribution lines 140. Thus, each of the first and second materials from the first and second tanks 110, 120 is capable of being distributed at each of the row units 30 by way of one or the other of the first and second meters 80, 90 at the respective row units.

Whether the system 10 distributes the first or second materials at any given time (assuming that the nurse inductor boxes of both of the tanks 110,120 are actuated so that the tanks are outputting the materials) is determined by whether the first or second meters 80, 90 are switched on or off by a control mechanism (not shown). Depending upon the type of control mechanism that is used, the planter 20 can operate in a variety of ways. For example, in one embodiment, all of the first meters 80 are switched on and off as a group, and all of the second meters 90 are switched on and off as a group. Thus, the planter 20 is capable of distributing only the first material from the first tank 110, or only distributing the second material from the second tank 120, or distributing both simultaneously, or distributing neither, from each of its row units 30 spread across its frame 40. In certain circumstances, the control mechanism can be actuated by way of control signals that are provided electronically from the cab of the tractor towing the planter 20, which are actuated, for example, by the farmer or a computerized device on the tractor. In other embodiments, the control mechanism is solely located on the planter 20. For example, the control mechanism can determine whether to turn on or off the sets of meters 80, 90 based upon sensed terrain conditions, or upon position information, which in certain embodiments can be provided by way of GPS (Global Positioning System) signals. In certain embodiments, one or more of the individual meters 80, 90 are independently controllable in addition to, or instead of, being controllable as part of the set of corresponding meters 80 or 90.

Figure 2:
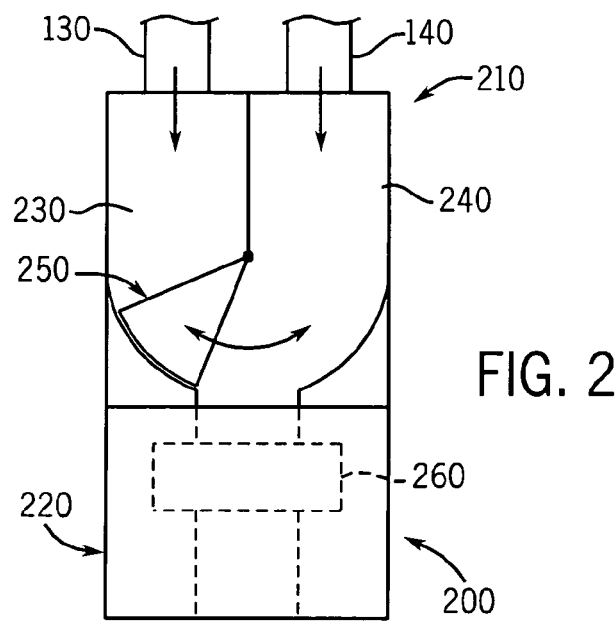
FIG. 2 is a side elevation view of an exemplary meter having a dual-compartment receiver and a flapper for use in an alternate embodiment of the system of FIG. 1.

Turning to FIG. 2, an alternate embodiment of the system 10 shown in FIG. 1 includes only a single meter 200 of the type shown in FIG. 2 at each of the row units 30 in place of the first and second meters 80, 90. Each of the meters 200, in contrast to the meters 80, 90, includes a partitioned reservoir 210 having first and second compartments 230 and 240, which respectively receive the first and second materials via corresponding nurse distribution lines of the first and second sets 130 and 140, respectively. Each of the first and second compartments 230, 240 is couplable to a remainder 220 of the meter, which includes a singulator 260 of the meter. The flow of the first and second materials in the first and second compartments 230, 240, respectively, to the remainder of the meter 220 is governed by the position of a flapper 250. The flapper 250 can take on any of three positions at any given time, where the first position is one in which the material from the first compartment 230 is allowed to flow into the remainder of the meter 220, the second position (as shown in FIG. 2) is one in which the material from the second compartment 240 is allowed to flow into the remainder of the meter, and the third position is a closed position precluding flow into the remainder of the meter.

The system 10 as modified to include the meters 200 in place of the meters 80, 90 at the row units 30 can be controlled in largely the same ways as the system 10 of FIG. 1 is controlled. That is, control signals from sensors, switches in an operator cab, wireless (including GPS) sources and/or other sources can be provided to the meters 200 to control the flappers 250 of those meters, and thereby control which of the first and second materials is distributed by the meters. In certain embodiments, the flappers 250 also are able to be set into an intermediate position in which both of the first and second materials are provided to the remainder of the meter 220 simultaneously and thus blended. However, in the embodiment shown in FIG. 2, where the flapper 250 is only settable to the first, second and third positions, the meters 200 are only capable of distributing one or the other of the first and second materials at any given time.

The system 10 as modified to include the meters 200 has certain advantages and disadvantages in comparison with the system of FIG. 1 with the meters 80, 90. In particular, when the flapper 250 switches in its position in order to switch over from the distribution of one of the first and second materials to the other, a small quantity of the originally-distributed material remains within the remainder of the meter 220 that must be distributed before the meter begins to distribute the new type of material. Consequently, with the use of the meters 200 there is no longer an instantaneous change of the material being distributed when the change is created by movement of the flapper 250, in contrast to the instantaneous changes that can be achieved with the switching on and off of the meters 80, 90.

To ameliorate this problem, in certain embodiments, the control mechanism for the meters 200 includes circuitry or software that determines the amount of time that it will take for the current contents of the meter to be completely distributed subsequent to the changing of the position of the flapper 250. The control mechanism further determines a time at which it is desired that the meter 200 begin distributing its new material ("desired change time"), and accordingly causes the flapper 250 to be switched at a time earlier than the desired change time in order to account for the delay resulting from the time amount that is required to empty the meter of the material that is currently being distributed. The amount of material within the meter 200 (particularly within the remainder of the meter 220) and consequently the amount of time that it will take to empty that material can be determined by way of any one of a number of known techniques, including by way of sensors and various calculation software, and the time at which a change in the material being distributed is desired can be determined by way of other sensors, GPS signals, or other signals provided by an operator or other control mechanism.

Figure 3:
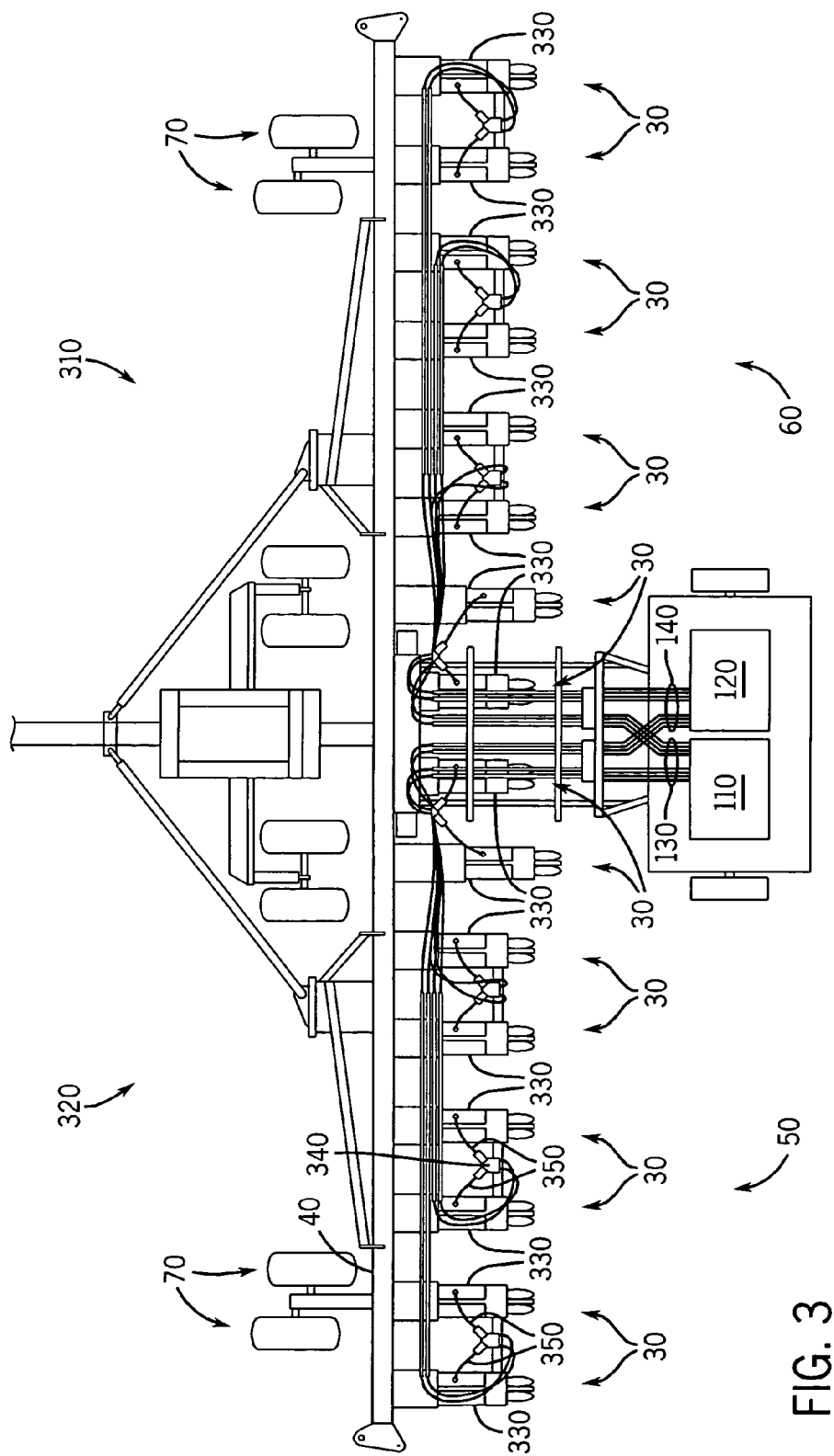
FIG. 3 is a top view of an exemplary agricultural vehicle employing a second embodiment of a system for distributing multiple materials from the vehicle.

Turning to FIG. 3, a second embodiment of a system 310 for distributing two or more materials is shown implemented on an exemplary 40-foot planter 320. As with the planter 20 of FIG. 1, the planter 320 includes a plurality of row units 30 mounted on a frame 40 on left and right sides 50, 60 of the planter, rides upon multiple wheels 70, and is capable of storing first and second materials in first and second tanks 110, 120. The first and second tanks 110, 120 are coupled to first and second sets of nurse distribution lines 130 and 140, respectively. In contrast to the system 10, the system 310 includes only a single meter 330 at each of the row units 30, where each of the meters has a small reservoir and a singulator. The first and second materials stored at the first and second tanks 110, 120 of the planter 320 are provided to the meters 330 as follows. One of the nurse distribution lines of each of the first and second sets 130, 140 is provided to each of a plurality of nurse headers 340 that are respectively located proximate to (e.g. between) pairs of the row units 30. Each of the nurse headers 340 is coupled to the two meters 330 of the two row units 30 nearby by way of a pair of secondary nurse distribution lines 350.

Figure 4:
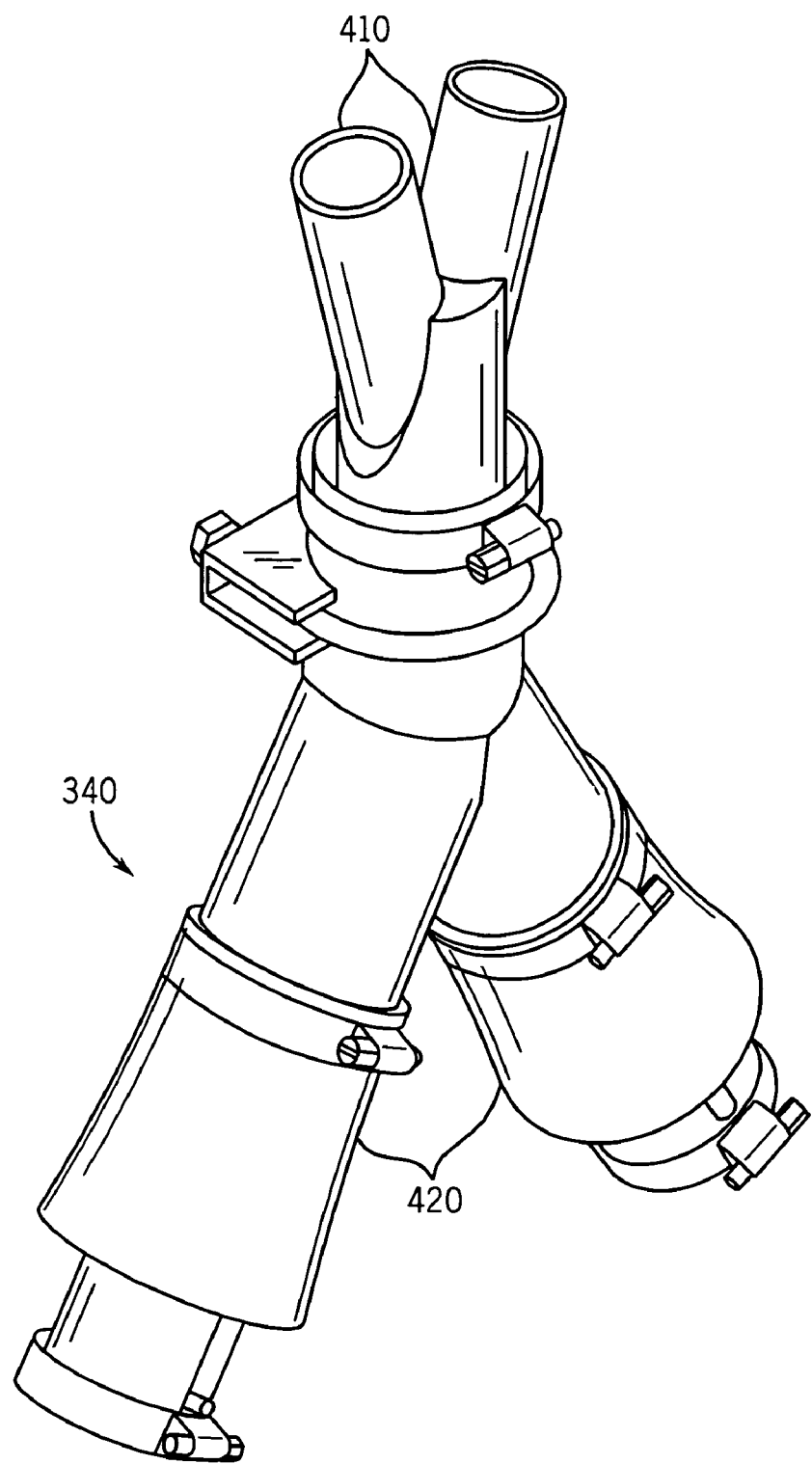
FIG. 4 is a side perspective view of an exemplary nurse header for use in the system of FIG. 3.

Referring additionally to FIG. 4, one of the nurse headers 340 is shown in more detail. Specifically as shown, the nurse header 340 is generally X-shaped and has a pair of input ports 410 and a pair of output ports 420. The input ports 410 are respectively coupled to one of each of the first and second sets of nurse distribution lines 130, 140, while each of the outputs 420 is coupled by one of the secondary nurse distribution lines 350 to one of the meters 330. In alternate embodiments, the number of outputs 420 could be increased to more than two outputs to provide material to more than two meters. Likewise, in alternate embodiments in which there are more than two materials available for distribution, the nurse header 340 could be modified to have more than two inputs 410 (as well as further modified to have one, two or more outputs 420).

The nurse header 340 operates to allow either one of the materials provided at either of the inputs 410 to be provided out of both of the outputs 420 and thus to both of the meters 330 coupled to those outputs by way of the secondary nurse distribution lines 350. Which of the first and second materials provided to the respective inputs 410 is in turn communicated to the outputs 420 and to the meters 330 depends upon the operation of the nurse distribution system. In particular, the material delivered out of each of the first and second tanks 110, 120 (e.g., by way of the nurse inductor boxes of those respective tanks) is driven through the nurse distribution lines 130, 140 in response to air pressure being provided to the respective tanks by an air pressure supply system (which can exist either as part of the planter 320 or on a separate vehicle coupled to the planter such as an air cart). If the nurse inductor box (not shown) of the first tank 110 is actuated, the first material within that tank is communicated through the nurse distribution lines 130 to each of the nurse headers 340 and thus provided to each of the meters 330 by way of the outputs 420 of the nurse headers. If, however, the nurse inductor box (not shown) of the second tank 120 is actuated, then the second material is communicated through the second set of nurse distribution lines 140 to each of the nurse headers 340 and then to the meters 330. In other embodiments, rather than controlling which of the materials is provided to the meters by way of controlling air being supplied to the first and second tanks 110, 120, control is provided by way of a product regulator on a nurse inductor box.

Because there is some finite distance between the nurse headers and the meters 330 to which the nurse headers are coupled by way of the secondary nurse distribution lines 350, there is a short delay between the time at which there is a switch in the air supplies provided to the first and second tanks 110, 120 and the time(s) at which the type of material that is being distributed by the meters 330 changes. As discussed with reference to the embodiment shown in FIG. 2, the control mechanism for the system 310 can include software or circuitry that compensates for this delay in time by switching the actuation of nurse inductor boxes of the tanks 110, 120 at a time somewhat earlier than the time at which it is desirable for the material being distributed at the row units 30 to change.

Figure 5:
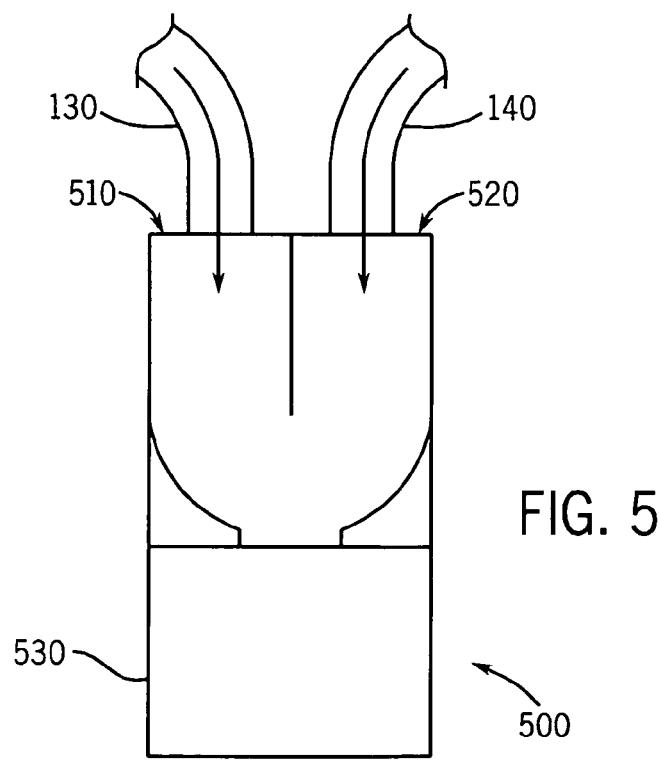
FIG. 5 is a side elevation view of an exemplary meter having a dual-compartment receiver for use in conjunction with an alternate embodiment of the system of FIG. 3.

Referring to FIG. 5, the system 310 shown in FIG. 3 can be modified for planters that are somewhat smaller than the 40-foot planter 320 shown in FIG. 3. In particular, instead of coupling the nurse distribution lines 130, 140 to the nurse headers 340, one of each of the sets of first and second nurse distribution lines is coupled to first and second inlets 510, 520 of specialized meters 500 located at the respective row units. Each of the meters 500 is configured so that each of the inlets 510 and 520 is coupled to a remainder of the meter 530 (which includes a singulator). Although the meters 500 are similar to the meters 200 of FIG. 2, the meters 500 do not include any flappers such as the flappers 250 that govern which of the materials supplied to the meters in turn are provided to the remainders 530 of the meters. Instead, as in the case of the operation of the nurse header 340, whether the first material or the second material is provided for distribution by each meter 500 depends upon which of the nurse distribution lines is communicating its material due to the actuation of a nurse inductor box of its corresponding tank, or due to how the product regulator on the nurse inductor box has been controlled. As in the case of the embodiment of FIG. 2, there is a short time delay between the time at which the material that is being provided from the tanks 110, 120 is switched and the time at which the type of material that is being distributed by the meters 500 is switched, due to the need to allow remaining material within the remainders 530 of the meters 500 to be distributed out of the meters. Consequently, again as discussed above, the control mechanism can be designed to take into account this delay as it is controlling the operation of the system.

Figure 6:
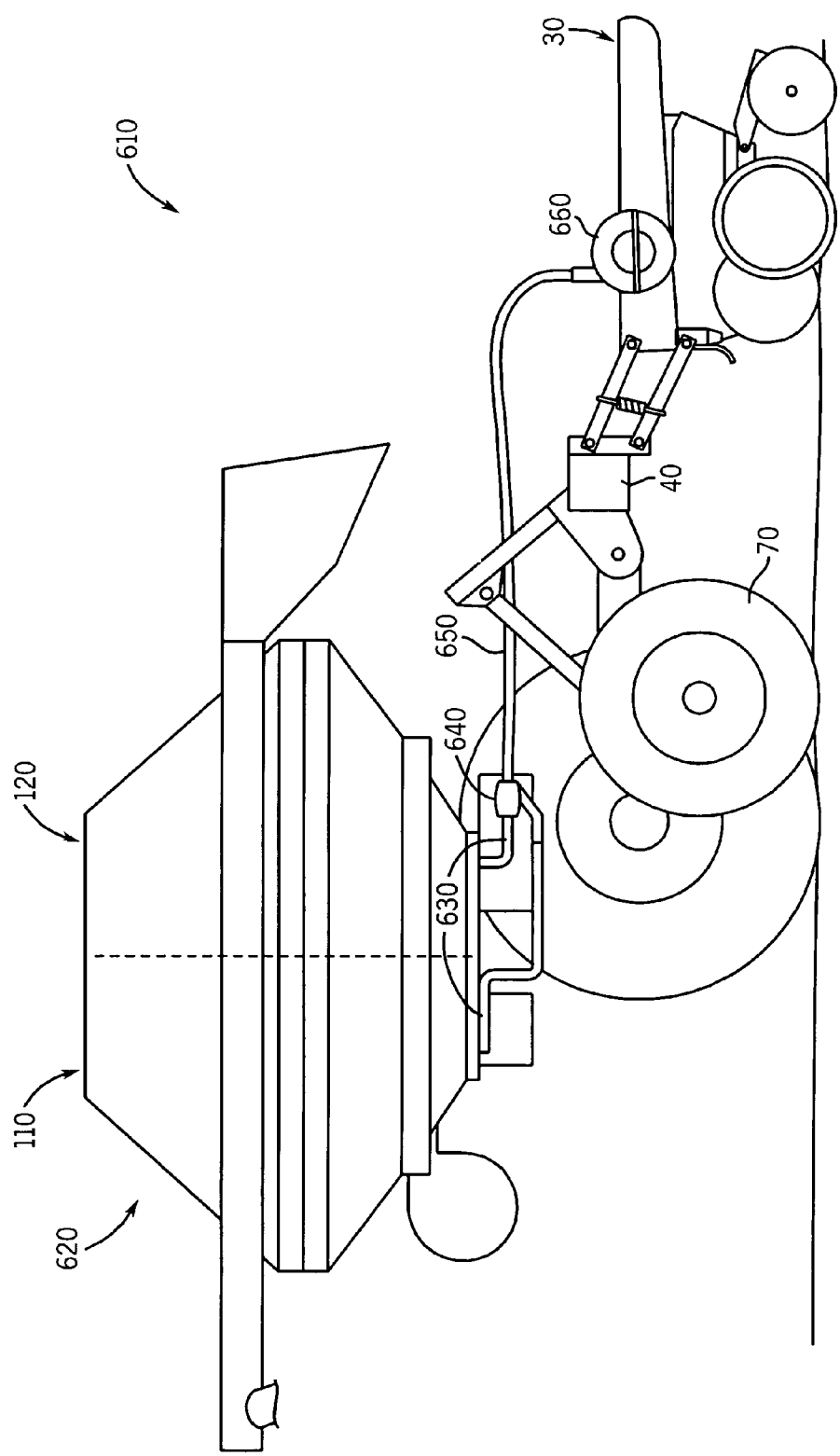
FIG. 6 is a side elevation view of an exemplary agricultural vehicle employing a third embodiment of a system for distributing multiple materials from the vehicle.

Turning to FIG. 6, a third embodiment of a system 610 for controlling the distribution of multiple materials is shown implemented on a planter 620 (this time shown in a side elevation view). As with respect to the planters 20 and 320, the planter 620 includes a plurality of row units 30 mounted on a frame 40, is supported by multiple wheels 70, and has first and second tanks 110, 120 that can be filled with first and second materials. As shown, in this embodiment, each of the first and second tanks 110, 120 is coupled by a respective primary nurse distribution line 630 to a combiner valve 640, which in turn is coupled by way of secondary nurse distribution lines 650 to each (or at least some) of the row units 30, specifically to a single meter 660 at each of the row units. The combiner valve 640 (also termed a combiner/selector valve) is designed to allow flow from one of the tanks 110, 120 to the multiple row units 30 to which it is coupled at any given time. Depending upon the embodiment, one combiner valve 640 can supply all of the row units 30 or, alternately, two or more combiner valves can be employed with respect to subsets of the row units. Also, in some embodiments the combiner valves 640 are capable of mixing the materials provided by the primary nurse distribution lines 630 coupled to it, and then providing that mixture to the secondary nurse distribution lines 650 for distribution at the row units.

In certain embodiments (not shown), the combiner valve 640 can provide the material to intermediate nurse distribution lines that in turn are coupled to nurse headers such as the nurse header 340 shown in FIG. 3, which in turn are coupled to two or more of the row units 30. For example, on a 40-foot planter with 30-inch spacing between row units, 16 meters could be fed by way of eight combiner valves (each of which is connected to each of the first and second tanks 110, 120) that are respectively coupled to eight intermediate nurse distribution lines that are in turn coupled to eight nurse headers having dual outputs (with each output being coupled to a separate row unit). In an alternate embodiment, two sets of four combiner valves each could be employed, where each set of four valves was independently actuated. In such an embodiment, it would be possible to switch off between the materials being distributed at sets of row units 30 corresponding to the sets of combiner valves.

Figure 7:
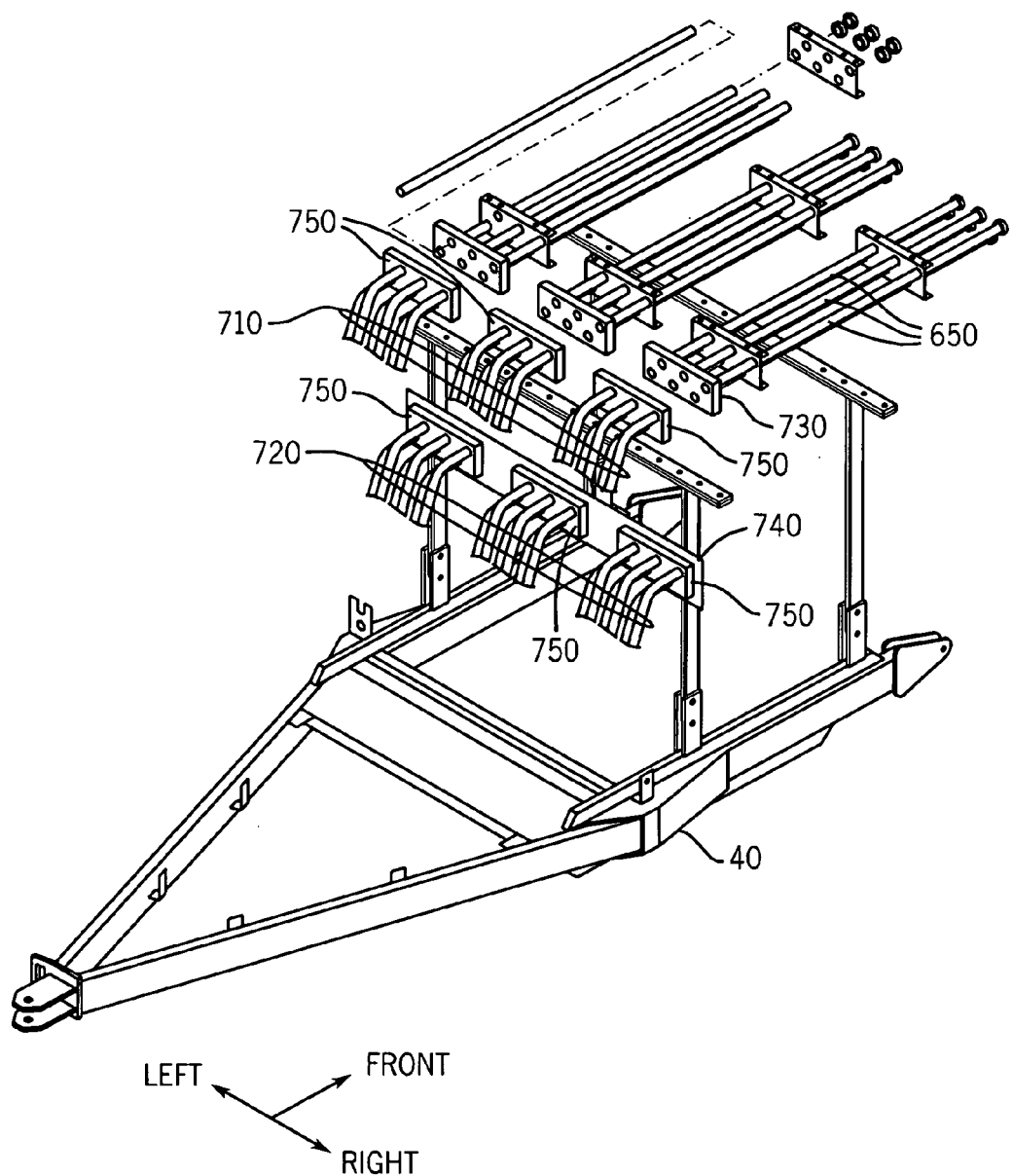
FIG. 7 is an exploded, rear, perspective view of an exemplary agricultural vehicle employing a fourth embodiment of a system for distributing multiple materials from the vehicle.

Referring to FIG. 7, an alternate embodiment of the system 610 is shown in which the combiner valves 640 are replaced with a manually-operated mechanism for quickly changing the coupling of the intermediate nurse distribution lines 650 to first and second sets of primary nurse distribution lines 710 and 720 (shown in cutaway), which are respectively coupled to the respective nurse inductor boxes (not shown) of the first and second tanks 110, 120 (see FIG. 6). As shown, in one configuration the first set of primary nurse distribution lines 710 from the first tank are all positioned to be coupled to a first set of mounting brackets 730, while the second set of primary nurse distribution lines 720 from the second tank are all coupled to a second set of mounting brackets 740 (with both of the sets of mounting brackets being attached to the implement). Because the first set of mounting brackets 730 are in turn coupled to the intermediate nurse distribution lines 650 while the second set of mounting brackets 740 are not (the second set effectively forming a "dead end"), in this configuration it is the material of the first tank 110 coupled to the first set of primary nurse distribution lines 710 that is distributed to the intermediate nurse distribution lines 650 and thus to the row units.

However, in another configuration (not shown), the primary nurse distribution lines of the second set 720 are coupled to the first mounting brackets 730 while the primary nurse distribution lines of the first set 710 are coupled to the second mounting brackets 740. In such configuration, it is the material of the second tank 120 coupled to the second set of primary nurse distribution lines 720 that is distributed to the intermediate nurse distribution lines 650 and thus to the row units. As shown, because the first and second sets of mounting brackets are actually made up of multiple brackets, each of which is configured to receive six of the primary nurse distribution lines 710,720 (and which can be configured, in alternate embodiments, to receive greater or lesser numbers of such nurse distribution lines), in further configurations it is possible to "mix and match" the first and second sets of primary nurse distribution lines 710,720 with the different brackets 730,740. For example, it would be possible to attach some of the first set of primary nurse distribution lines 710 to some of the first set of mounting brackets 730, while others of the first set of primary nurse distribution lines were attached to the second set of mounting brackets 740, and to attach some of the second set of primary nurse distribution lines 720 to some of the first set of mounting brackets, while others of the second set of primary nurse distribution lines were attached to the second set of mounting brackets. Attached in this manner, it would be possible to deliver different materials simultaneously to different ones of the row units. The number of mounting brackets in each of the first and second sets 730,740 can vary depending upon the number of row units.

As shown further by FIG. 7, the manual coupling and decoupling of the different primary nurse distribution lines 710,720 with respect to the first and second sets of mounting brackets 730,740 is facilitated through the use of brackets that are "quick-connect brackets" as are known to those of ordinary skill in the art. In the embodiments shown, each of the first and second sets of mounting brackets 730,740 is a female bracket that is configured to receive and be attached to one of the complementary male brackets 750 to which six of primary nurse distribution lines 710,720 are directly attached. In one embodiment, once a male bracket 750 is positioned into one of the female brackets 730 or 740, a latch mechanism (not shown) is then employed to securely couple the respective brackets. Thus, connections can be established between sets of six of the primary nurse distribution lines 710,720 and sets of six of the intermediate nurse distribution lines 650 simply by coupling one of the male brackets 750 to one of the female mounting brackets of the first and second sets 730,740.

In the embodiment shown in FIG. 7, the brackets 740 have plugs that effectively seal the ends of whatever primary nurse distribution lines 710,720 happen to be coupled to those brackets (by way of their corresponding male brackets 750). This is appropriate, since the primary nurse distribution lines 710,720 that are coupled to the bracket 740 are decoupled from the intermediate nurse distribution lines 650, and consequently is desirable to eliminate air flow within those unused lines and therefore eliminate the inadvertent communication of material down the inactive lines. In alternate embodiments, a variety of different types of brackets or coupling mechanisms can be employed instead of or in addition to the quick-connect male and female brackets 750,730 and 740. Also, the brackets 730–750 can vary in terms of the numbers of nurse distribution lines that are coupled to each bracket. Regardless of the embodiments, the coupling mechanisms should be facilitate the rapid coupling and decoupling of the primary nurse distribution lines 710,720 with respect to the intermediate nurse distribution lines 650.

Each of the embodiments of the systems for distributing multiple materials discussed above, except for the embodiment shown in FIG. 7, allows for "on-the-go" switching of materials. However, depending upon the embodiment, the complexity of the switching operation varies due to the time delay that can occur between the time at which a switching action is taken and the time at which the meters at the row units actually switch in terms of the type of material that is being distributed. In particular, as the nodes (e.g., the nurse headers 340, etc.) at which the nurse distribution lines from the first and second tanks mesh move away from the meters and toward the tanks, the delays occurring between the time at which the switching action is taken and the actual switching in material distribution increase. That is, the embodiment of FIG. 1 has virtually no delay since there are dedicated meters 80, 90 for the different materials and it is the meters themselves that are being turned on and off. However, the embodiments of FIGS. 2 and 5 involve some delay due to the fact that, upon the taking of a switching action, remaining material must be distributed out of the meters 200, 500 (specifically, out of the remainders of the meters 220, 530) before the new material begins to be distributed. The delay increases even further with reference to the embodiment of FIG. 3, since the material within the secondary nurse distribution lines 350 must be distributed before any new material can be distributed. With respect to the embodiment of FIG. 6, the delay is relatively short insofar as any delay only occurs due to leftover material existing within the receiver(s) of the seed meters. While the amount of delay varies among the different embodiments, the cost effectiveness of the various designs is somewhat inversely related to the amount of the delay that is involved. That is, the embodiment of FIG. 6 involving the combiner valves 640 is the least expensive to implement (aside from the embodiment of FIG. 7), while the embodiment of FIG. 1 having the dual sets of meters 80, 90 is the most expensive to implement.

As discussed above, the various embodiments shown in FIGS. 1–7 can be implemented on a variety of different types of agricultural vehicles, and are not limited to the planters shown in the figures. Further, each of the embodiments can be implemented with respect to agricultural vehicles in which more than two types of materials from more than two tanks (or more than two compartments of a given tank) are employed.

To apprise the public of the scope of this invention, the following claims are made:

The invention claimed is:

1. A system for distributing first and second materials comprising:
   first and second sources holding the first and second materials, respectively;
   a plurality of distribution units; and
   a nurse distribution mechanism configured to selectively communicate each of the sources with each of the distribution units by which each of the first and second materials from the respective first and second sources can be individually transmitted to the plurality of distribution units;

wherein the plurality of distribution units includes a first plurality of meters and a second plurality of distribution units includes a first plurality of meters and a second plurality of meters, wherein a respective one of each of the first and second pluralities of meters is included within each of the respective distribution units.

2. The system of claim 1, wherein the first material from the first source is transmitted to the plurality of distribution units at a first time, and the second material from the second source is transmitted to the plurality of distribution units at a second time.

3. The system of claim 1, wherein the nurse distribution mechanism includes first and second pluralities of distribution lines, wherein each of the first plurality of distribution lines is coupled between the first source and a respective one of the first plurality of meters, and wherein each of the second plurality of distribution lines is coupled between the second source and a respective one of the second plurality of meters.

4. The system of claim 3, wherein each of thee meters of the first and second pluralities of meters is capable of being turned on and turned off by way of at least one signal provide by at least one of an electrical signal transmitted by wire, a wireless signal, and a GPS signal.

5. A system for distributing first and second materials comprising:
first and second sources holding the first and second materials, respectively;
a plurality of distribution units; and
a nurse distribution mechanism configured to selectively communicate each of the sources with each of the distribution units by which each of the first and second materials from the respective first and second sources can be individually transmitted to the plurality of distribution units;
wherein the plurality of distribution units includes a plurality of meters, and wherein each of the meters includes first and second receiver compartments.

6. The system of claim 5, wherein communication between the compartments of the respective meters and metering devices of those respective meters is controlled by way of a flapper.

7. The system of claim 6, wherein the nurse distribution mechanism includes first and second pluralities of distribution lines, wherein each of the first plurality of distribution lines is coupled between the first source and the first receiver compartment of a respective one of the plurality of meters, wherein each of the second plurality of distribution lines is coupled between the second source and the second receiver compartment of a respective one of the plurality of meters, and wherein the respective flapper of each respective meter determines whether the meter distributes material from its respective first receiver compartment or from its respective second receiver compartment.

8. The system of claim 7, wherein each of the flappers of each of the meters is capable of being controlled from a remote location.

9. A system for distributing first and second materials comprising:
first and second sources holding the first and second materials, respectively;
a plurality of distribution units; and
a nurse distribution mechanism configured to selectively communicate each of the sources with each of the distribution units by which each of the first and second materials from the respective first and second sources can be individually transmitted to the plurality of distribution units;
wherein the nurse distribution mechanism comprises:
first and second primary lines coupled to the first and second sources, respectively;
a plurality of secondary lines coupled to at least some of the distribution units, wherein each of the secondary lines is coupled to a respective one of the distribution units; and
a valve coupled to the first and second primary lines and to each of the plurality of secondary lines.

10. The system of claim 9, wherein the valve is positioned closer to the first and second sources than to the distribution units.

11. The system of claim 9, wherein the valve is capable of combining the first and second materials to form a combination material, and capable of providing the combination material by way of the secondary lines to the distribution units.

12. A system for distributing first and second materials comprising:
first and second sources holding the first and second materials, respectively;
a plurality of distribution units; and
a nurse distribution mechanism configured to selectively communicate each of the sources with and each of the distribution units by which each of the first and second materials from the respective first and second sources can be individually transmitted to the plurality of distribution units,
wherein the plurality of distribution units includes a plurality of meters,
wherein each of the meters includes a receiver having first and second inlets,
wherein the nurse distribution mechanism includes first and second pluralities of distribution lines,
wherein each off the first plurality of distribution lines is coupled between the first source and the first inlet of the receiver of a respective one of he plurality of meters, and
wherein each of the second plurality of distribution lines is coupled between the second source and the second inlet of the receiver of a respective one of the plurality of meters.

13. The system of claim 12,
wherein whether the respective receivers receive the first material or the second material by way of the respective first or second inlets is determined by one of a setting on a respective nurse inductor box and a status of air being supplied to at least one of the first and second sources.

14. A system for distributing first and second materials comprising:
first and second sources holding the first and second materials, respectively;
a plurality of distribution units; and
a nurse distribution mechanism configured to selectively communicate each of the sources with each of the distribution units by which each of the first and second materials from the respective first and second sources can be individually transmitted to the plurality of distribution units;
wherein the nurse distribution mechanism further comprises:

first and second primary lines coupled to the first and second sources, respectively;

a plurality of secondary lines coupled to at least some of the distribution units, wherein each of the secondary lines is coupled to a respective one of the distribution units; and a coupling mechanism that, in a first position, couples the first primary line to the plurality of secondary lines and, in a second position, couples the second primary line to the plurality of secondary lines.

15. The system of claim 14, wherein the coupling mechanism is manually actuatable.

16. A system for distributing first and second materials comprising:

first and second sources holding the first and second materials, respectively;

a plurality of distribution units; and a nurse distribution mechanism configured to selectively communicate each of the sources with each of the distribution units by which each of the first and second materials from the respective first and second sources can be individually transmitted to the plurality of distribution units;

wherein the nurse distribution mechanism comprises:

a first primary line coupled to the first source;

a second primary line coupled to the second source;

a first nurse header coupled to each of the first and second primary lines; and a first plurality of secondary lines, each of which is coupled to the first nurse header and additionally is coupled to a respective one of the plurality of distribution units, wherein at least some of the plurality of distribution units are coupled to the first nurse header by the plurality of secondary lines;

a third primary line coupled to the first source;

a fourth primary line coupled to the second source;

a second nurse header coupled to each of the third and fourth primary lines; and a second plurality of secondary lines, each of which is coupled to the second nurse header and additionally is coupled to a respective one of the plurality of distribution units, wherein a first subset of the plurality of distribution units are coupled to the first nurse header by the first plurality of secondary lines, and another subset of the plurality of distribution units are coupled to the second nurse header by the second plurality of secondary lines.

* * * * *